United States Patent [19]

Torpey

[11] 3,871,999
[45] Mar. 18, 1975

[54] REMOVAL OF POLLUTANTS FROM WASTE-WATER
[75] Inventor: Wilbur N. Torpey, Douglaston, N.Y.
[73] Assignee: Autotrol Corporation, Milwaukee, Wis.
[22] Filed: Jan. 31, 1974
[21] Appl. No.: 438,414

Related U.S. Application Data
[63] Continuation-in-part of Ser. No. 338,355, March 5, 1973, abandoned.

[52] U.S. Cl.................................... 210/16, 210/17
[51] Int. Cl............................................. C02c 1/02
[58] Field of Search............. 210/11, 12, 15, 16, 17, 210/7, 5, 2, 3, 4, 14

[56] References Cited
UNITED STATES PATENTS
3,575,849  4/1971  Torpey................................ 210/14
3,654,147  4/1972  Levin et al........................... 210/16

OTHER PUBLICATIONS
Johnson, W. K. et al.; Nitrogen Removal by Nitrification and Denitrification; Journal W.P.C.F., Vol. 36, August 1964, pp. 1015-1036.

Antonie, R. L.; "Three-Step Biological Treatment with the Bio-Disc Process;" paper presented at the New York W.P.C.A., Spring Meeting, June 12-15, 1972.

Gasser, R. et al.; "Comparison of Various Nitrogen Sources in Anaerobic Treatment," Journal W.P.C.F., Feb. 1969, pp. 91-100.

Primary Examiner—Thomas G. Wyse
Assistant Examiner—Benoit Castel
Attorney, Agent, or Firm—Kenneth A. Koch

[57] ABSTRACT

A biological method for effecting removal of substantially all of the ammonia nitrogen as well as 85 to 95% of the carbonaceous matter present in normal domestic wastewater. The process can include a first stage which oxidizes a minor portion of the ammonia present to nitrates and a second stage that provides denitrification of remaining nitrogenous compounds. The second stage is operated in a manner excluding molecular oxygen to encourage the growth of microorganisms that use nitrate oxygen for respiration and ammonia as an energy source.

12 Claims, 6 Drawing Figures

REMOVAL OF POLLUTANTS FROM WASTE-WATER

RELATED APPLICATIONS

This application is a continuation-in-part of copending application Ser. No. 338,355 filed Mar. 5, 1973, and now abandoned.

BACKGROUND AND PRIOR ART

The invention pertains to the biological treatment of normal domestic wastewater to remove pollutants. As used herein the term "normal domestic wastewater" is meant to define wastewater that typically contains from about 10 to about 35 mg/liter, usually at least about 20 mg/liter of ammonia nitrogen and from about 100 to about 300 usually about 200 mg/liter of biodegradable organic matter as well as other pollutants such as phosphorous compounds. However, it should be realized that the concentration of the various pollutants in wastewater is a function of many variables, such as rainfall, time of day, time of year, industrial load, etc. More specifically, the invention is primarily concerned with providing a process for substantially reducing the concentration of nitrogen compounds in the effluent discharged from wastewater treatment plants into natural receiving waters such as lakes, rivers and streams.

Prior art wastewater treatment systems typically include primary treatment consisting of the physical removal, by sedimentation and/or screening, of settleable and floatable solids; secondary treatment in the form of either activated sludge, trickling filtration or rotating, partially submerged biological contactors to remove most of the remaining soluble carbonaceous matter, and, in some instances tertiary treatment to remove other materials such as soluble nitrogenous compounds, e.g., ammonia and nitrates.

Studies have indicated that excessive amounts of nitrogen compounds, usually in the form of ammonia, are a prime reason for the excessive depression of the dissolved oxygen level in natural receiving waters, thus creating an unsatisfactory environment for many biological species. Various governmental bodies have responded to the problem of the discharge of excessive amounts of nitrogenous compounds into natural receiving waters by regulating the permissible concentration of such compounds in wastewater effluents. The State of Maryland has set a limit of 1 mg/liter of nitrogen in the form of ammonia in wastewater discharged into the Petuxet River; the Potomac Enforcement Conference has recently required the removal of 85% of the total nitrogen from all wastewater discharged into the receiving waters from the Washington Metropolitan area; and the State of Illinois has stipulated that the ammonia-nitrogen concentration in wastewater effluents be reduced to not more than 2.5 mg/liter.

The nitrogenous matter in normal domestic wastewater which is of concern, is mainly in the form of ammonia, a smaller fraction is in the form of albuminoid nitrogen and the remainder is in the form of protein. The proteinaceous matter in wastewater exists mainly in particulate form and is physically removed by conventional primary and secondary treatment processes.

Advanced treatement processes for removing ammonia-nitrogen from wastewater follow two general lines of approach (1) the physio-chemical and (2) the biological. Physio-chemical processes generally have the basic disadvantage of being costly, producing undesirable side effects, generating a concentrated brine for disposal, and in some cases, polluting the air with ammonia vapors. The biological processes on the otherhand, promote the natural cycling of nitrogen, i.e., oxidation of the ammonia and denitrification of the resulting nitrates to nitrogen gas.

Known biological processes for converting ammonia-nitrogen to nitrogen gas require a multistep procedure including the conversion of ammonia to nitrate compounds and the subsequent biological conversion of the nitrates to nitrogen gas and water. The latter conversion step requires the addition of a suitable organic material, such as methanol, to the wastewater, to provide energy sufficient for the denitrifying organisms to utilize the nitrate oxygen. The required addition of a nutrient material in prior art denitrifying processes not only is costly, but if not controlled will either not cause the desired rate of denitrification or will result in the discharge of methanol into the process effluent.

It is the primary objective of the invention to provide a process for biologically converting a substantial portion of the ammonia-nitrogen contained in normal domestic wastewater to nitrogen gas without having to supply nutrient additives, such as methanol, which is required by the prior art. The new process can also provide for the removal of from about 85 to 95% of the carbonaceous matter measured in terms of $BOD_5$ (biochemical oxygen demand). $BOD_5$ is a measure of the concentration of biodegradable organic carbon in the fluid, obtained by determining the concentration of biodegradable organic carbon in the fluid, obtained by determining the concentration of oxygen consumed (mg/liter) at 68°F. during a 5 day period.

SUMMARY OF THE INVENTION

In accordance with the foregoing objectives, the process of the invention comprises two basic stages. Raw wastewater that has been treated by sedimentation and/or screening to remove settleable and floatable solids is subjected to biological treatment in Stage 1 of the new process which includes a first biological treament unit, operated according to any of well known methods employing either suspended or attached biological cultures to remove from about 85 to about 95% of the carbonaceous matter, measured in terms of $BOD_5$, and to biochemically oxidize a minor portion, preferably less than about 50%, most preferably from about 20 to about 40% of the ammonia nitrogen present to form oxidized nitrogenous compounds that include nitrates and nitrites. A primary function of Stage 1 of the new process is to oxidize less than one half of the ammonia nitrogen present while conserving the remaining portion of ammonia nitrogen. The portion of ammonia nitrogen oxidized in Stage 1 is preferably less than the portion conserved although the direct conversion of a small, usually negligible, portion of the ammonia nitrogen directly to nitrogen gas has been observed in Stage 1. Typically the wastewater influent to Stage 1, which is usually treated to remove solids, but can be raw wastewater, contains from about 10 to about 35 mg/liter of ammonia nitrogen. In a preferred form, Stage 1 can provide for the oxidation of a relatively small fraction of the ammonia nitrogen present so that from about 2, preferably 5, to about 15 mg/liter of oxidized nitrogen compounds are produced. A substantial concentration of ammonia nitrogen is thus conserved from the subsequent treatment stage. The Stage 1 effluent should contain at least about 2, preferably at least about 5, mg/liter of oxidized nitrogenous compounds, usually in the form of nitrates; at least about 5, preferably at least about 10 mg/liter of ammonia nitrogen, and from about 5 to about 30 mg/liter of residual biodegradable organic matter measured as $BOD_5$. According to the principles of the invention, the composition of the wastewater effluent from Stage 1 is primarily a function of the composition of the influent wastewater.

Stage 2 of the new process includes a second biological treatment unit and comprises further biological treatment of the Stage 1 effluent under the condition of an oxygen deprived atmosphere to force the biochemical conversion of substantially all of the remaining ammonia nitrogen into nitrogen gas which is evolved to the atmosphere. Stage 2 functions to biochemically oxidize conserved ammonia nitrogen via denitrifying organisms that are grown in Stage 2 by utilizing the oxidized nitrogenous compounds of Stage 1 as an oxygen source. The pH of the wastewater in the second biological treatment unit should be between about 6 and about 8 and the wastewater temperature should be in the range of about 55°F. to 75°F. to provide the proper conditions for the biochemical oxidation of the conserved ammonia nitrogen. The ammonia nitrogen concentration in the effluent from Stage 2 is typically only from about 2 to 5 mg/liter and a similarly low concentration of residual nitrates is present. According to the invention, it is preferred to have some soluble carbonaceous matter present in the Stage 2 wastewater. However, the amount of soluble carbonaceous matter present in the Stage 2 wastewater should not exceed the residual BOD from Stage 1, i.e., organic matter either in the form of an external nutrient or wastewater should not be added to the Stage 2 unit of the process.

According to the principles of the invention, Stage 2 of the process is operated in a manner to make molecular oxygen unavailable to microbiological organisms attached to some form of surface media in order to force them to utilize nitrate oxygen for their respiration. Moreover, since the concentration of carbonaceous matter has been previously reduced, the environment has been prepared to force the use of ammonia nitrogen as an energy source, i.e., as matter to be oxidized by the organisms as part of their metabolism. It is therefore an important aspect of the invention to remove from about 85 to 95% of the $BOD_5$ content of the wastewater prior to Stage 2.

Although the mechanism of the biochemical reactions taking place in Stage 2 is known to be most complex, it is believed that specific groups of microorganisms provide the pathway for utilizing the ammonia present in the wastewater for their nutrition and the nitrite or nitrate oxygen for their respiration, thereby reducing the ammonia nitrogen to a low energy level. Stage 2 of the invention utilizes the ammonia already present in the wastewater for an energy source for the microbiological forms of Stage 2, rather than having to supply organic material, such as methanol, as required by the prior art. The new process is thus self-perpetuating, i.e., uses only materials naturally present in the wastewater for treatment.

The required presence of oxidized nitrogenous compounds, particularly nitrates, in the Stage 2 influent can be obtained by operating Stage 1 in a manner to nitrify only a minor fraction, i.e., less than 50% of the ammonia nitrogen present in the wastewater, in addition to the removal of a substantial amount of the biochemically oxidizable carbonaceous matter. Alternatively, oxygen containing nitrogen compounds such as sodium nitrate could be added to the Stage 2 wastewater influent after most of the carbonaceous matter was removed. Preferably, the Stage 1 treatment is operated to produce nitrates in the range of concentration required for the Stage 2 influent.

In further accordance with the invention, the Stage 2 influent includes at most 15% of the carbonaceous material, measured in terms of $BOD_5$, present in the raw presettled wastewater. Microorganisms in Stage 2, utilizing carbonaceous material for nutrition are therefore relatively starved, thus severely reducing the availability of carbonaceous matter and forcing the use of ammonia nitrogen as an energy source. In contrast, Stage 1 comprises primarily organisms using carbonaceous matter for their nutrition and secondarily organisms using ammonia.

Stage 2 of the invention includes a treatment tank having surfaces, either fixed or rotatable, for the growth of slimes of nitrogen consuming organisms. The slime supporting surfaces of Stage 2 are isolated from molecular oxygen either by entirely immersing them in the wastewater or physically excluding molecular oxygen from the treatment tank.

Preferably, the slime supporting surfaces of Stage 2 are rotatable biological contactors in the form of a plurality of closely spaced thin discs, drums, cylinders, brushes, etc. A preferred contactor has a discontinuous honeycomb-type structure and is disclosed in pending U.S. Pat. Application Ser. No. 252,038 filed May 10, 1972, and now U.S. Pat. No. 3,827,559. The rotatable biological contactors, according to this aspect of the invention, can be either partially or fully submerged in the wastewater. When only partially submerged, a physical enclosure can be provided over the top of the treatment tank to exclude molecular oxygen from the exposed contactor surfaces. Fixed, fully submerged surfaces, such as those shown and described in Hayes U.S. Pat. No. 2,458,163 can also be used to grow the organisms of Stage 2.

The Stage 2 influent wastewater as described above, i.e., wastewater having a low concentration of carbonaceous matter and oxidized nitrogenous compounds including nitrates, and a significant concentration of ammonia nitrogen, is supplied to the Stage 2 treatment unit. The treated wastewater is preferably obtained from a Stage 1 treatment unit that is operated to remove 85 to 95% of the carbonaceous matter, measured in terms of $BOD_5$, from presettled raw wastewater and to oxidize a minor portion of the ammonia nitrogen present in the presettled raw wastewater to nitrate of nitrite form. Only a small portion of the influent ammonia should be oxidized in Stage 1 since according to the invention, a major portion of the influent ammonia must be conserved for use in Stage 2 as a source of nutrition for the specific organisms that serve to metabolize, i.e., biochemically oxidize a substantially large fraction of the remaining ammonia.

The Stage 1 treatment facility can be any appropriate means that can be operated to produce effluent wastewater meeting the foregoing criteria. Well known prior art methods include the widely used activated sludge and trickling filter processes. A preferred Stage 1 process comprises a tank having partially submerged, rotatable biological contactors mounted therein. The contactors can be in the form of thin discs, cylinders, etc. or the honeycomb structure, as previously described.

The partially submerged contactors, are forcibly rotated to expose the organisms on the contactor surfaces alternately to the atmosphere for the absorption of oxygen and immerse them in the wastewater for the bioextraction of nutrients. Such rotating biological contactors can be arranged to subject the wastewater to treatment by a number of components operated either in series or in parallel, sufficient to remove about 85 to 95% or more of the biodegradable organic matter and oxidize a portion of the ammonia nitrogen present in the raw wastewater.

Representative wastewater treatment systems utilizing partially submerged rotating biological contactors for the treatment of wastewater are shown and described in Torpey U.S. Pat. No. 3,575,849; El Naggar U.S. Pat. No. 3,335,081; Simpson U.S. Pat. No. 3,466,241; and Hartmann et al. U.S. Pat. No. 3,389,798. Biological systems employing partially submerged rotatable contactors can be operated to remove 85 to 95% $BOD_5$ and to oxidize a minor fraction of the ammonia present by regulating the surface loading rate, e.g., the gallons per day of influent per square foot of contactor surface, as will be hereinafter more fully described.

BRIEF DESCRIPTION OF THE DRAWING

The invention will be further explained with reference to the drawing in which.

DESCRIPTION OF PREFERRED EMBODIMENTS

Figure 1:
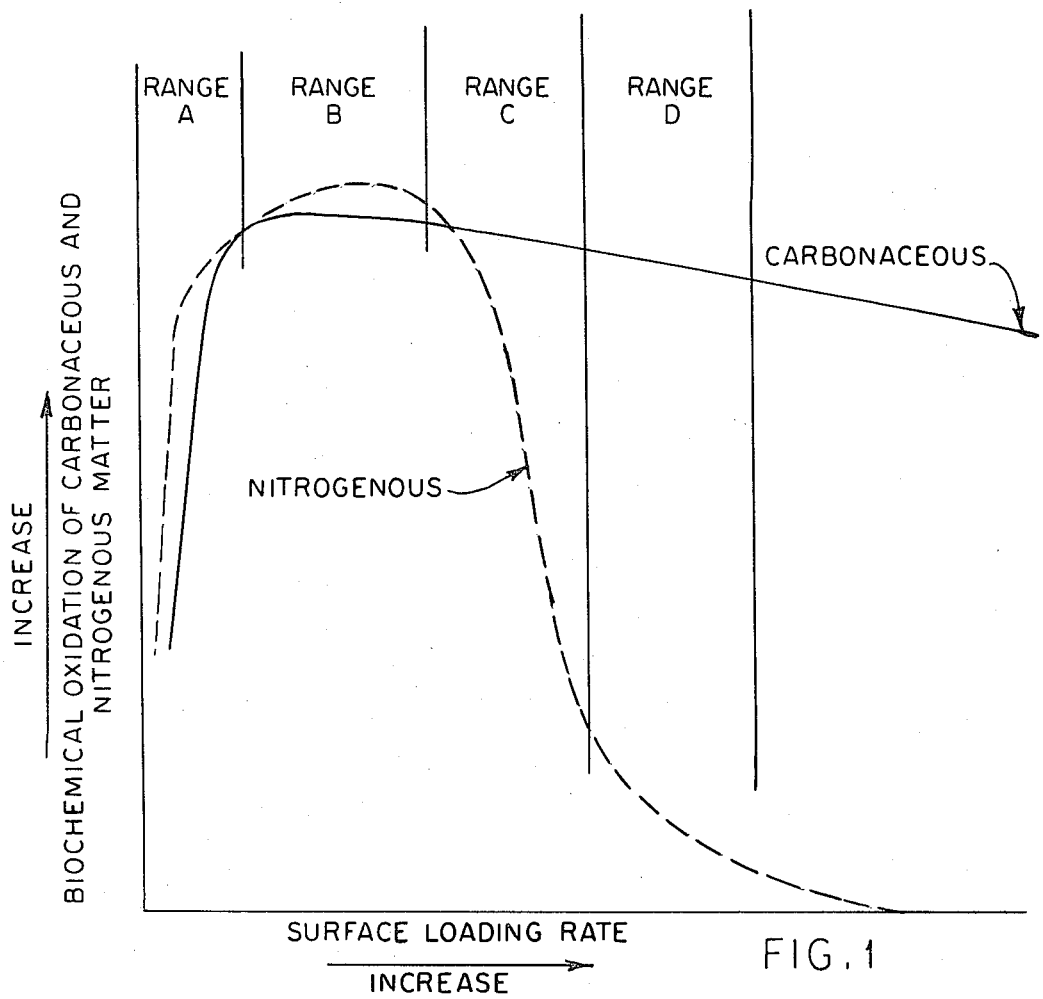
FIG. 1 is a pair of curves schematically showing the effect of surface loading rate on the biochemical oxidation of carbonaceous and nitrogenous matter for a single or multiple stage treatment unit employing partially submerged rotatable biological contactors.

Referring to FIG. 1, the relationship between the surface loading rate of partially submerged rotatable contactors and both carbonaceous and nitrogenous pollutant removal is shown in terms of four ranges of biological activity.

Range A embraces a transitory range of loading rate wherein varying degrees of starvation have been induced for both the organisms using carbonaceous and nitrogenous matter.

Range B embraces a range of loading rates, wherein a degree of starvation for organisms using carbonaceous matter has been induced, while the activity of organisms using nitrogenous matter is relatively unrestricted.

Range C embraces a range of loading rates, wherein increases cause organisms using carbonaceous matter to increasingly dominate the environment, resulting in a rapid decrease in the rate of oxidation of nitrogenous matter.

Range D defines a range of loading rates at which the concentration of carbonaceous matter at the slime-wastewater interface is sufficiently high to cause the organisms using carbonaceous matter to substantially dominate the environment, permitting, however, the growth of nitrifying organisms, to a degree sufficient to result in from about 5 to about 15 mg/liter of nitrate nitrogen in the effluent.

Pursuant to a preferred form of the invention, the Stage 1 treatment unit is operated in the loading rate range defined by Range D of FIG. 1. The contactor loading rate of Range D is from about 1.0 to about 3 gal/day/sq.ft for a single stage unit (operated in parallel) and 1.5 to 5 gal/day/sq.ft for a multiple stage unit (operated in series) when treating normal domestic wastewater, the temperature of which lies in the range of 53°F. to 80°F.

Figure 2:
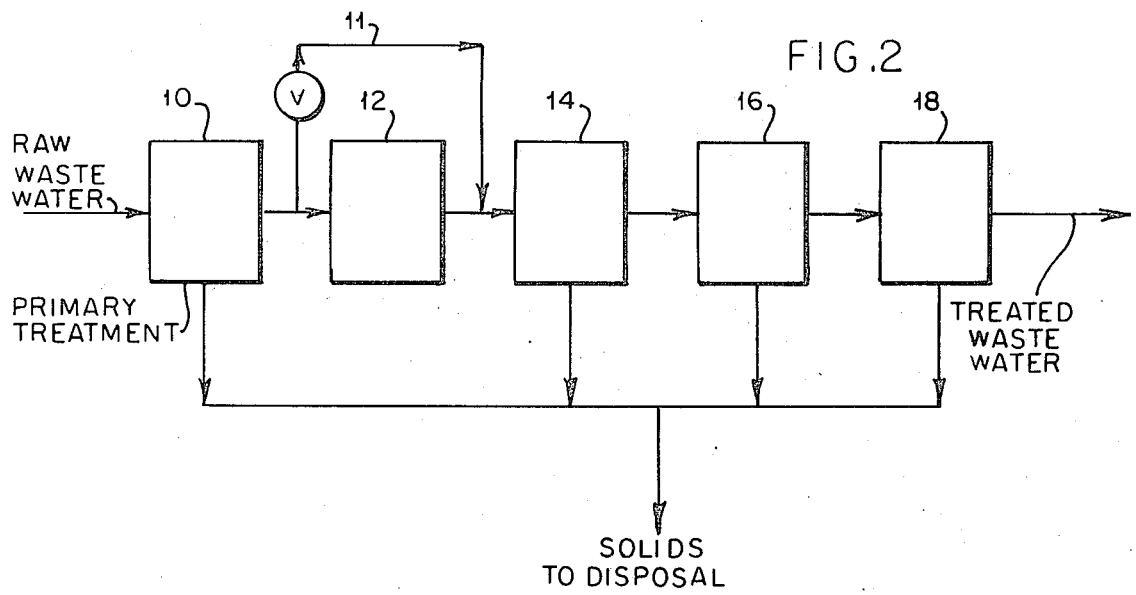
FIG. 2 is a schematic flow of a process incorporating the principles of the invention.

FIG. 2 illustrates a complete wastewater treatment process incorporating the principles of the invention. Raw wastewater is supplied to a primary treatment unit 10 which can include a fine screening device or a coarse screening device and a settling tank which is usually designed to provide 1 to 2 hours of detention time for the wastewater at average flow rates.

From primary treatment 10, the wastewater may be conducted directly to the Stage 1 unit 14 via bypass line 11 or to and through holding tank 12. Tank 12 has a volume adequate to dampen or substantially eliminate the diurnal fluctuations in wastewater flow rate in order to minimize the amount of contactor surface requirements. Means, typically a rate controller device or pump, are provided at the outlet of holding tank 12 to supply a substantially constant flow rate of wastewater to the Stage 1 unit 14.

From Stage 1 unit 14, the wastewater is supplied to a Stage 2 unit 16. Effluent wastewater from the Stage 2 treatment unit is fed to a final settling tank 18 wherein the suspended solids in the treated wastewater are removed. Solids accumulated from units 10 and 18 are withdrawn and disposed of by appropriate means (not shown).

Figure 3:
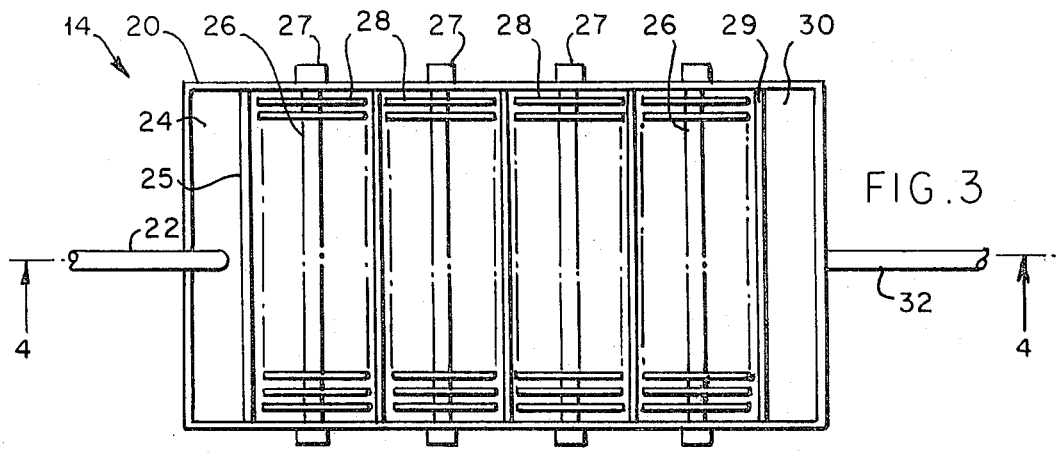
FIG. 3 is a schematic plan view showing a preferred Stage 1 biological treatment unit.
Figure 4:
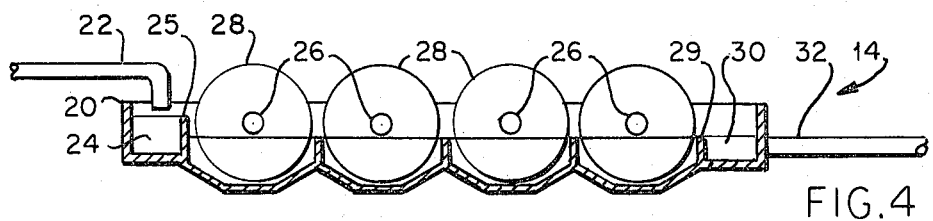
FIG. 4 is a schematic elevation view taken along line 4—4 of FIG. 3.
Figure 5:
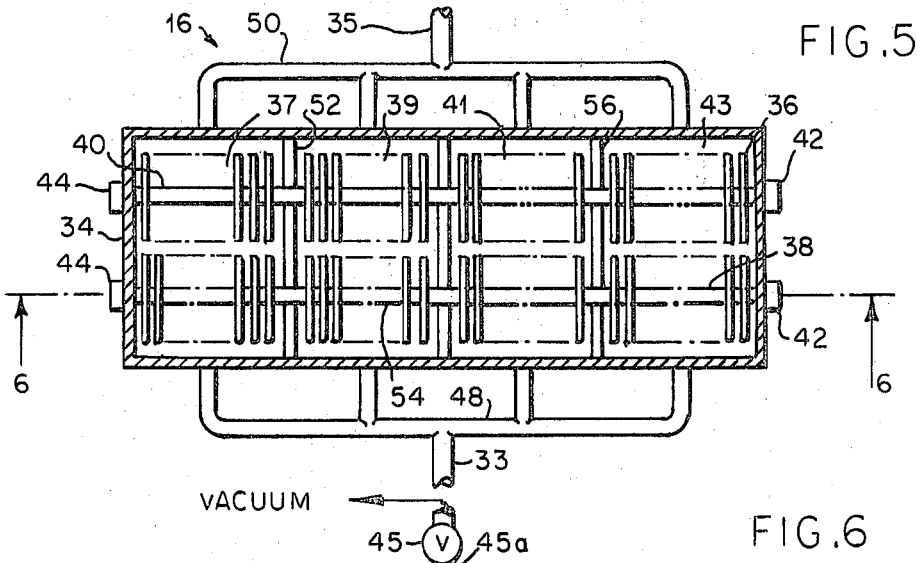
FIG. 5 is a schematic plan view showing a preferred Stage 2 biological treatment unit.
Figure 6:
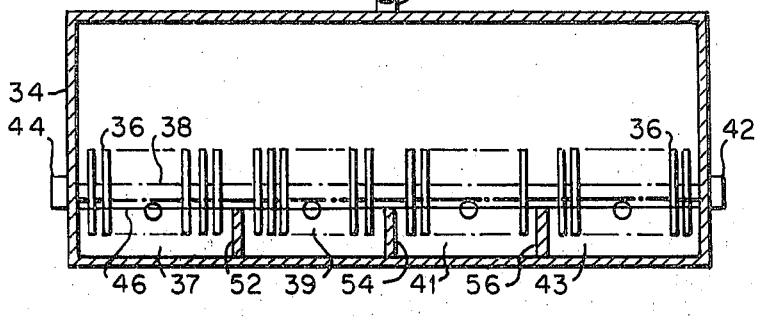
FIG. 6 is a schematic elevation view of the treatment unit of FIG. 4 taken along line 6—6.

Referrring now to FIGS. 3 and 4, a preferred means for practicing Stage 1 of the invention employing partially submerged biological contactors is shown. The treatment unit shown in FIGS. 3 and 4 includes multiple stages of disc assemblies and is operated in series with the wastewater successively flowing through each of the disc assemblies as it travels from the tank inlet to the outlet. Alternatively, the treatment unit of FIGS. 3 and 4 can be operated as a single stage unit with the disc assemblies arranged in parallel as shown in FIGS. 5 and 6 relating to the second stage treatment unit, and as will be described hereinafter. In a single stage parallel arrangement, each disc assembly is supplied with and treats an equal portion of the influent wastewater, while in the multistage series arrangement, each disc assembly is successively supplied with and treats all of the influent wastewater. When Stage 1 is operated as a single stage unit biochemical oxidation of both carbonaceous matter and ammonia can proceed simultaneously on the same surface.

Referring to FIGS. 3 and 4, presettled or screened wastewater is supplied to tank 20 through conduit 22. The wastewater is discharged into distribution chamber 24 and flows into the tank uniformly across its width over weir 25. A plurality of rotatable parallel shafts 26 supported by bearings 27 are uniformly disposed along the length of tank 20. An appropriate drive mechanism (not shown) is provided to rotate shafts 26 at predetermined rates. A plurality of biological contactors 28 are mounted on each of shafts 26, transverse to their axis and spaced along their length. The contactors 28 are typically from about 10 to about 12 feet in diameter, spaced about ½ to 1 inch apart and may extend into the wastewater obtained by tank 20 from about one-third to two-thirds of their diameter. The contactors are rotated at a peripheral velocity from about 0.5 to about 2.0 feet per second to alternately supply the organisms growing thereon with atmospheric oxygen and nutrients. Treated wastewater flows over weir 29, into distribution chamber 30 and leaves Stage 1 via conduit 32.

In accordance with a specific aspect of the invention, Stage 1 of the process is operated to remove from 85 to 95% $BOD_5$ of the carbonaceous matter present in the influent to tank 20 and to convert a small portion, i.e., less than 50%, of the ammonia nitrogen present to nitrates or nitrites. The effluent leaving tank 20 through conduit 32 should contain from about 5 to about 10 mg/liter of nitrogen in the form of oxidized nitrogen compounds, at least about 10 mg/liter of ammonia nitrogen and from about 5 to 30 mg/liter of residual biodegradable organic matter. It is important that Stage 1 be operated so as not to oxidize a larger portion of the ammonia present than is necessary to produce the required nitrate concentration in the effluent, since the ammonia nitrogen is needed as an energy source for the microorganisms that develop in Stage 2. Accordingly, Stage 1 is preferably operated within the range of surface loading rate characterized in Range D of FIG. 1, i.e., a loading rate of from about 1.0 to about 3 gallons/day of influent wastewater per square foot of contactor surface when operating all the component parts as a single stage unit and 1.5 to 5 gallons per day per square foot when operating the component parts in series, as shown in FIGS. 3 and 4.

More specifically and further pursuant to this aspect of the invention, the Stage 1 unit shown in FIGS. 3 and 4 can be supplied with normal presettled wastewater which typically contains about 125 mg/liter of carbonaceous $BOD_5$ and about 25 mg/liter of nitrogen in the form of ammonia, at a rate of 1 M.G.D. (million gallons per day). At a surface loading rate of 2.5 gal/day/sq.ft, 400,000 square feet of contactor surface should be provided. Using the foregoing treatment unit, the concentration of carbonaceous matter, measured in terms of $BOD_5$, can be reduced by 90% and about 5 mg/liter of nitrate nitrogen will be contained in the effluent from the tank 20.

A preferred Stage 2 treatment unit 16 is shown in FIGS. 5 and 6. The Stage 2 treatment unit includes a tank 34 containing a plurality of partially submerged biological contactors 36 mounted for rotation on each of shafts 38, 40 which are supported on bearings 42, 44 and driven by an appropriate drive mechanism (not shown). Pursuant to the invention, Stage 2 is operated in a manner to deprive the microorganisms of molecular oxygen, thereby forcing them to utilize nitrate oxygen for their respiration. Accordingly, tank 34 can be fully enclosed and thus isolated from the atmosphere.

The biological contactors 36 are typically from about 10 to about 12 feet in diameter. The contactors typically have a spacing between adjacent surfaces of from about ½ to about 1 inch and are rotated at a peripheral velocity between about 0.5 and 1 ft/sec. Typically, the level of wastewater in tank 34 is below shafts 38, 40 as indicated by surface 46 in FIG. 6, although, as previously indicated, the Stage 2 unit can be operated with the contactors fully submerged to deprive the slimes of atmospheric oxygen. When fully submerged contactors are employed, tank 34 need not be fully enclosed.

The tank 34 receives normal domestic wastewater that has been treated to remove from 85 to 95% of the soluble carbonaceous matter, measured as $BOD_5$, and contains from about 5 to about 15 mg/liter of nitrogen in the form of nitrate compounds and more than 10 mg/liter of ammonia nitrogen through inlet conduit 33. The Stage 2 unit should be sized to provide a loading rate of from about 1 to about 4 gal/day of influent per sq.ft of contactor surface.

Based on supplying tank 34 with 1 M.G.D. of wastewater treated in accordance with the foregoing description of Stage 1 unit of FIGS. 3 and 4, the Stage 2 unit of FIGS. 5 and 6 should contain about 500,000 sq.ft of contactor surface. The effluent leaving Stage 2 through conduit 34 would contain about 5 to 10 mg/liter of nitrate nitrogen and from 0 to 5 mg/liter of ammonia nitrogen. During operation of the Stage 2 unit, gasses evolved from the wastewater are removed by a control valve 45 through vent 45a.

Preferably, both the supply conduit 33 and discharge conduit 35 communicate with tank 34 through inlet and outlet manifolds 48 and 50. Tank 34 is preferably divided into a plurality of separate chambers 37, 41, 43 and 49 by partitions 52, 54 and 56, which are fed in parallel by inlet manifold 48 as needed to effect process control, i.e., the maintenance of predetermined conditions such as specific loading rate of the contactors with varying flow rates. A similar parallel chamber configuration can be used with the Stage 1 treatment unit of FIGS. 3 and 4 if desired or necessary to meet the aforementioned conditions for Stage 1.

As disclosed in the foregoing description, the removal of ammonia nitrogen from wastewater is thus effected through biochemical oxidation and reduction to nitrogen gas using only the constituents normally present in wastewater. An important characteristic of the invention is the oxidation of ammonia utilizing nitrate oxygen as an oxygen source. By use of this process, the ammonia nitrogen is converted to nitrogen gas as an end product, which is evolved to the atmosphere with no deleterious effects on the environment as is the case when wastewater is stripped of ammonia and the ammonia evolved to the atmopshere.

I claim:

1. A method for treating wastewater including at least about 10 mg/liter of ammonia nitrogen and at least about 100 mg/liter of carbonaceous pollutants, expressed as $BOD_5$, comprising the steps of supplying said wastewater to a first biological treatment unit, biochemically oxidizing from about 85 to 95% $BOD_5$ in said first biological treatment unit, biochemically oxidizing at least about 20% and less than about 50% of said ammonia nitrogen in said first biological treatment unit to form oxidized nitrogenous compounds while conserving at least 50% of said ammonia nitrogen, supplying wastewater effluent from said first biological treatment unit to a second biological treatment unit a predetermined rate, said second biological treatment unit including a plurality of rotatable contactors having surface area for the growth and maintenance of denitrifying organisms, said predetermined rate being from about 1 to about 4 gallons per day per square foot of said surface area, said contactors being at least partially submerged in said wastewater, said wastewater having a temperature from about 53°F. to about 80° F. and a pH from about 6 to about 8 in said second biological treatment unit, rotating said contactors in said wastewater at a peripheral velocity from about 0.5 to about 1 foot per second to grow and maintain denitrifying organisms on said surface area, and excluding molecular oxygen from said denitrifying organisms, said denitrifying organisms biochemically oxidizing conserved ammonia nitrogen by utilizing said oxidized nitrogenous compounds as an oxygen source whereby nitrogen gas is evolved and denitrification proceeds without the addition of an external carbonaceous energy source.

2. The method according to claim 1 wherein the content of soluble carbonaceous pollutants in said wastewater in said second biological treatment unit consists solely of the residual carbonaceous pollutants from said first biological treatment unit.

3. The method according to claim 1 wherein said wastewater effluent from said first biological treatment unit contains from about 5 to about 15 mg/liter of oxidized nitrogenous compounds.

4. The method according to claim 1, wherein from about 20 to about 40% of the ammonia-nitrogen present in said wastewater is oxidized to form oxidized nitrogenous compounds in said first biological treatment unit.

5. The method according to claim 1 wherein said contactors are fully submerged in said wastewater in said second biological treatment unit.

6. The method according to claim 1 wherein said first biological treatment unit employs supporting surface in the form of rotatable contactors for the growth and miantenance of organisms.

7. The method according to claim 6 wherein said biochemically oxidizing steps proceed simultaneously on said rotatable contactors in said first biological treatment unit.

8. A method for treating wastewater including at least about 10 mg/liter of ammonia nitrogen and at least about 100 mg/liter of carbonaceous pollutants, expressed as $BOD_5$ comprising the steps of
 a. supplying said wastewater to a first biological treatment unit at a first predetermined rate,
 b. said first biological treatment unit including a first plurality of rotatable biological contactors having first surface area for the growth and maintenance of biological slimes, said contactors being partially submerged in said wastewater,
 c. rotating said first plurality of biological contactors at a first predetermined peripheral velocity to alternately expose said surface area to said wastewater and an oxygen containing atmosphere and grow aerobic biological slimes,
 d. said aerobic biological slimes biochemically oxidizing from about 85 to about 95% of said $BOD_5$,
 e. said aerobic biological slimes biochemically oxidizing at least about 20% and less than about 50% of said ammonia nitrogen to form oxidized nitrogenous compounds,
 f. conserving at least 50% of said ammonia nitrogen in said first biological treatment unit,
 g. said first predetermined rate being from about 1 to about 5 gallons per day per square foot of said first surface area,
 h. said first predetermined peripheral velocity being from about 0.5 to about 2 ft/sec,
 i. removing effluent wastewater from said first biological treatment unit,
 j. said effluent wastewater containing at least about 5 mg/liter of oxidized nitrogenous compounds and at least about 5 mg/liter of ammonia nitrogen,
 k. supplying said effluent wastewater to a second biological treatment unit at a second predetermined rate,
 l. said second biological treatment unit including a second plurality of rotatable biological contactors at least partially submerged in said wastewater and having second surface area for the growth and maintenance of denitrifying biological slimes,
 m. rotating said second plurality of biological contactors at a second predetermined peripheral velocity to grow and maintain denitrifying biological slimes on said second surface area,
 n. excluding molecular oxygen from said denitrifying organisms,
 o. said denitrifying biological slimes biochemically oxidizing conserved ammonia nitrogen utilizing oxidized nitrogenous compounds as an oxygen source,
 p. said second predetermined rate being from about 1 to about 4 gallons/day/square foot of said second surface area,
 q. said second predetermined peripheral velocity being from about 0.5 to about 1 ft/sec,
 r. the content of soluble carbonaceous matter in said second biological treatment unit consisting solely of residual carbonaceous matter from said first biological treatment unit,
 s. said wastewater in said second biological treatment unit having a temperature from about 53°F. to about 80°F. and a pH from about 6 to about 8, and
 t. removing said wastewater from said second biological treatment unit.

9. The method of claim 8 wherein said second plurality of biological contactors are fully submerged in said wastewater.

10. The method of claim 8 wherein from about 20 to about 40% of said ammonia nitrogen is biochemically oxidized in said first biological treatment unit.

11. The method of claim 8 wherein said ammonia nitrogen and $BOD_5$ are simultaneously oxidized on the same surface area of said first plurality of biological contactors.

12. The method of claim 11 wherein said first plurality of biological contactors are mounted on a single rotatable shaft disposed transverse to wastewater flow through said first biological treatment unit.

* * * * *